J. ROCHE.

MASTER KEY PADLOCK.

No. 11,465.

Reissued Jan. 22, 1895.

Witnesses
J. H. Shumway
Lillian D. Kelsey

James Roche
Inventor
By atty's
Earle Seymour

THE NORRIS PETERS CO., PHOTO-LITHO., WASHINGTON, D. C.

UNITED STATES PATENT OFFICE.

JAMES ROCHE, OF TERRYVILLE, CONNECTICUT, ASSIGNOR TO THE EAGLE LOCK COMPANY, OF SAME PLACE.

MASTER-KEY PADLOCK.

SPECIFICATION forming part of Reissued Letters Patent No. 11,465, dated January 22, 1895.

Original No. 525,562, dated September 4, 1894. Application for reissue filed November 21, 1894. Serial No. 529,535.

*To all whom it may concern:*

Be it known that I, JAMES ROCHE, of Terryville, in the county of Litchfield and State of Connecticut, have invented a new Improvement in Master-Key Locks; and I do hereby declare the following, when taken in connection with the accompanying drawings and the letters of reference marked thereon, to be a full, clear, and exact description of the same, and which said drawings constitute part of this specification, and represent, in—

Figure 1:
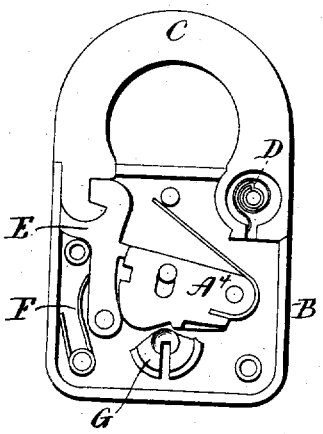
Figure 2:
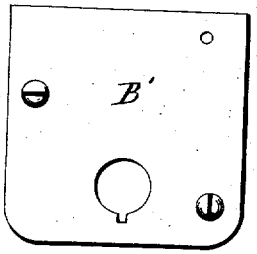
Figure 3:
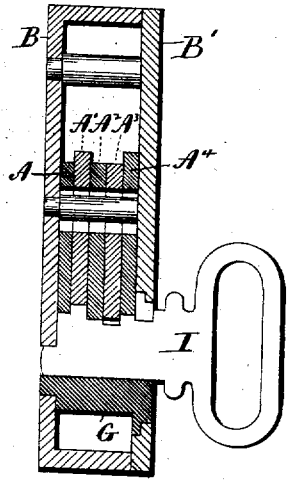
Figure 4:
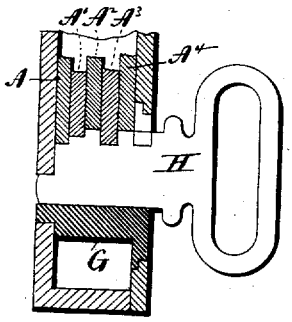
Figure 5:
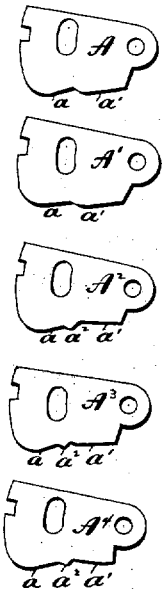

Figure 1, a view in side elevation of a padlock constructed in accordance with my invention; Fig. 2, a detached view of the cover thereof; Fig. 3, a sectional view of the lock, showing the co-operation of the special key with its tumblers; Fig. 4, a similar but less comprehensive view showing the co-operation of the master-key with its tumblers; Fig. 5, a view showing all of the tumblers detached and arranged in line.

My invention relates to an improvement in that class of locks known as master-key locks, which are locks constructed in series, and adapted to be individually operated by special keys, and collectively operated by a universal key known as the master-key, so that while the special key will not unlock any other lock of the series, the master-key will unlock every lock in the series, the object being to produce a simple, compact and effective lock, of few parts, and not liable to derangement.

With these ends in view, my invention consists in a master-key lock having certain details of construction and combinations of parts as will be hereinafter described and pointed out in the claims.

For the disclosure of my invention, I have chosen to show and describe a padlock, to which it is especially well adapted. As herein shown, the padlock is of ordinary construction, with the exception of its tumblers A, A′, $A^2$, $A^3$, and $A^4$, and comprises a case B, cover B′, hasp C, hasp-spring D, bolt E, bolt-spring F, and a slotted key-cylinder G. As the said parts named, with the exception of the tumblers, are of ordinary construction, it will not be necessary to describe either their construction or operation, in detail. With this lock I employ a master-key H, and a special key I, it being understood that the former is adapted to unlock all of the locks of the series to which the lock shown belongs, while the latter is adapted to unlock the particular lock shown only.

The tumblers have been mentioned as containing the invention herein. As shown, particular reference being called to Fig. 5, the outer edge of each one of them is constructed with two distinct operating faces $a$ and $a'$, arranged in line with each other, and having their inner ends closely adjacent, if not merging into each other. The tumblers $A^2$, $A^3$, and $A^4$ are constructed with shoulders $a^2$, forming stops to limit the movement of the keys. It is sufficient, however, to have one of the tumblers provided with such a stop, but it is not imperative that any of the tumblers be provided with stops, though by preference I shall have one or more of the tumblers so constructed. It is designed that the stop or stops shall be arranged so as to arrest the turning movement of the keys after the same have brought the tumblers into line for releasing the bolt. This makes the operation of the lock convenient, for the stops arrest the movement of the keys at exactly the right place for releasing the bolt; whereas, if no stops were employed, the operation of the lock would require a nicer manipulation of the keys. Thus, if there were no stops, the shackle would open automatically as soon as either key brought the tumblers into line, provided all the springs were in perfect condition, but if either the bolt-spring, or the shackle-spring failed to work, the key would naturally be turned past the point at which it brought all the tumblers into line, and the lock would not open until the key was turned back to that point, permitting the shackle to be opened by hand. It will thus be seen that, although the stops are a desirable feature of my improved lock, their use is not imperative further than they make the lock more convenient of operation.

The operating faces $a$, of the tumblers, are constructed and arranged to co-operate with the special key I, and are different either in form or combination in each lock of the series, so that each lock thereof must have its special key; but the faces $a'$ of the tumblers are the same in construction and combination in in every lock of the series, so that a master-key will fit all of the locks.

It will be understood from the construction shown and described, that when the special key I is inserted into the lock, it may be turned half a turn from left to right, whereby its bits will engage with the faces $a$, and operate the tumblers, which it will throw into their unlocked positions. The key must then be turned back from right to left for removal from the lock, from which it cannot be removed by turning it around to the right, because it is stopped by the stops of the tumblers. On the other hand the master-key H is inserted into the lock and turned a half turn from right to left, whereby its bits engage with the faces $a'$ of the tumblers, and throw them into their unlocked positions. This key is stopped and prevented from being removed by turning it still farther to the left by the shoulders $a^2$ of the tumblers, and must be removed from the lock by turning it a half turn back from left to right.

By constructing and arranging the elements of the lock so that the hasp bolt is operated in one direction by a spring, and not by either of the keys, I am enabled to operate the master-key and the special key in opposite directions, and to separate the operating faces of the tumblers sufficiently to permit them to be widely varied in form without interfering with each other. My improved lock has therefore a capacity for extensive differentiation in combinations.

It is not essential that all of the tumblers be provided with two distinct operating faces, but is sufficient if one of them is so provided, although the range of combination is very much increased if a number of special tumblers are used. Nor do I limit myself to arranging the separate operating faces as described, my invention comprehending broadly the construction of a tumbler having two distinct operating faces arranged so that the keys must be turned in opposite directions to engage them. I would therefore have it understood that I do not limit myself to the exact construction herein shown and described, but hold myself at liberty to make such changes and alterations as fairly fall within the spirit and scope of my invention.

I am aware, however, that a lock having one or more of its tumblers constructed upon its outer edge with two distinct operating faces arranged to co-operate with different keys, is old, and I do not claim that construction broadly.

I am aware, also, that a flat-key padlock having its bolt provided with a spring for actuating it in one direction is old, and I do not claim that construction broadly.

When my invention is embodied in a padlock the bolt will be operated in one direction by a spring as heretofore stated and in the opposite direction by the shackle or hasp which engages with it in closing.

Having fully described my invention, what I claim as new, and desire to secure by Letters Patent, is—

1. In a master-key lock, the combination with a bolt, of a spring for operating the same in one direction, and tumblers, one or more of them being constructed with two distinct operating faces respectively adapted to co-operate with different keys, which are turned in opposite directions respectively, substantially as described, and whereby the operating faces of the tumbler or tumblers may be widely differentiated for producing different combinations, inasmuch as, owing to the adaptation of the lock to have its respective keys turned in opposite directions, the said faces may be formed without reference to each other.

2. In a master-key lock, the combination with a bolt, of a spring for operating the same in one direction, and tumblers, one or more of them being constructed with two distinct operating faces respectively adapted to co-operate with different keys, which are turned in opposite directions respectively, and with a stop located between the said operating faces to limit the rotary movement of the keys, substantially as described.

3. In a master-key lock, the combination with the other elements or instrumentalities thereof, of one or more tumblers, one or more of which has two distinct operating faces respectively adapted to co-operate with different keys, which are turned in opposite directions respectively, substantially as described.

In testimony whereof I have signed this specification in the presence of two subscribing witnesses.

JAMES ROCHE.

Witnesses:
OTIS B. HOUGH,
J. A. RUSSELL.